US005451782A

United States Patent [19]

Kelley

[11] Patent Number: 5,451,782

[45] Date of Patent: Sep. 19, 1995

[54] MASS SPECTOMETRY METHOD WITH APPLIED SIGNAL HAVING OFF-RESONANCE FREQUENCY

[75] Inventor: Paul F. Kelley, San Jose, Calif.

[73] Assignee: Teledyne ET, Mountain View, Calif.

[21] Appl. No.: 399,097

[22] Filed: Mar. 3, 1995

Related U.S. Application Data

[63] Continuation of Ser. No. 83,972, Jun. 28, 1993, abandoned, which is a continuation-in-part of Ser. No. 34,170, Mar. 18, 1993, abandoned, which is a continuation of Ser. No. 884,455, May 14, 1992, Pat. No. 5,274,233, which is a continuation of Ser. No. 662,191, Feb. 28, 1991, abandoned.

[51] Int. Cl.[6] ........................ B01D 59/44; H01J 49/00

[52] U.S. Cl. ........................................ 250/282; 250/252

[58] Field of Search ......................... 250/281, 282, 292

[56] References Cited

U.S. PATENT DOCUMENTS

| | | | |
|---|---|---|---|
| 2,939,952 | 6/1960 | Paul et al. | 250/41.9 |
| 2,950,389 | 8/1960 | Paul et al. | 250/41.9 |
| 3,065,640 | 11/1962 | Langmuir et al. | 73/517 |
| 3,334,225 | 8/1967 | Langmuir | 250/41.9 |
| 4,540,884 | 9/1985 | Stafford et al. | 250/282 |
| 4,736,101 | 4/1988 | Skya et al. | 250/292 |
| 4,749,860 | 6/1988 | Kelley et al. | 250/282 |
| 4,761,545 | 8/1988 | Marshall | 250/282 |
| 4,771,172 | 9/1988 | Weber-Grabau | 250/282 |
| 4,818,869 | 4/1989 | Weber-Grabau | 250/289.2 |
| 4,882,484 | 11/1989 | Franzen et al. | 250/282 |
| 4,975,577 | 12/1990 | Franzen et al. | 250/291 |
| 4,982,088 | 1/1991 | Weitckemp | 250/290 |
| 5,075,547 | 12/1991 | Johnson et al. | 250/292 |
| 5,128,542 | 7/1992 | Yates et al. | 250/292 |
| 5,134,286 | 7/1992 | Kelley | 250/282 |
| 5,170,054 | 12/1992 | Franzen | 250/292 |
| 5,182,451 | 1/1993 | Schwartz | 250/292 |
| 5,182,451 | 1/1993 | Schwartz et al. | 250/292 |
| 5,196,699 | 3/1993 | Kelley | 250/282 |
| 5,198,665 | 3/1993 | Wells | 250/292 |
| 5,200,613 | 4/1993 | Kelley | 250/282 |
| 5,274,233 | 12/1993 | Kelley | 250/292 |
| 5,285,063 | 2/1994 | Schwartz et al. | 250/292 |
| 5,302,826 | 4/1994 | Wells | 250/292 |

FOREIGN PATENT DOCUMENTS 383961 2/1988 European Pat. Off. ...... H01J 49/42

(List continued on next page.)

OTHER PUBLICATIONS

Bolton, et al., "Ion Isolation and Modulated Ion Excitation for GC–MS/MS in an Ion Trap Mass Spectrometer," Proceedings of the 41st ASMS Conference on Mass Spectrometry, pp. 474a–474b (Sep. 1993 or Oct 1993).

(List continued on next page.)

*Primary Examiner*—Bruce C. Anderson
*Attorney, Agent, or Firm*—Limbach & Limbach

[57] ABSTRACT

A mass spectrometry method in which a combined field (comprising a trapping field and a supplemental field) is established and at least one parameter of the combined field is changed to excite ions trapped in the combined field sequentially (such as for detection). The supplemental field is a periodically varying field having an off-resonance frequency, in the sense that the supplemental field frequency nearly matches (but differs from) a frequency of motion of an ion stably trapped by the trapping field alone. Sequential ion excitation in accordance with the invention can rapidly eject a sequence of ions from a trap, or rapidly excite each ion to a degree sufficient for a desired purpose but insufficient for ejection from the trap, because the supplemental field will increase the trajectory of each ion in the sequence and because the supplemental field can have a sufficiently large peak-to-peak amplitude to increase each ion trajectory to a desired magnitude within a desired short time period. The trapped ions can be sequentially excited by holding the supplemental field fixed while changing at least one parameter of the trapping field, or by changing (such as scanning) at least one parameter of the supplemental field while holding the trapping field fixed. The amplitude of the supplemental field is kept sufficiently high to excite ions (via an off-resonance excitation mechanism) before they undergo resonant excitation.

22 Claims, 2 Drawing Sheets

FOREIGN PATENT DOCUMENTS

| | | | |
|---|---|---|---|
| 336990 | 4/1988 | European Pat. Off. | H01J 49/42 |
| 180328 | 5/1988 | European Pat. Off. | H01J 49/42 |
| 350159A | 1/1990 | European Pat. Off. | H01J 49/42 |

OTHER PUBLICATIONS

Extension of Dynamic Range in Fourier Transform Ion Cyclotron Resonance Mass Spectrometry via Stored Waveform Inverse Fourier Transform Excitation, Tao-Chin Lin Wang, Tom L. Ricca & Alan Marshall, Anal. Chem., 1986, 5B 2935–2938.

Non-Linear Resonances in Quadrupole Mass Spectrometers Due to Imperfect Fields, I. The Quadrupole Ion Trap, Dawson, et al., *International Journal of Mass Spectrometry and Ion Physics.* 2 (1969) pp. 45–59.

*Quadrupole Mass Spectrometry and Its Applications,* edited by P. H. Dawson, published by Elsevier 1976, pp. 49–52 and 65–78.

Alfred, et al., "Resonance Excitation of Ions Stored in a Quadrupole Ion Trap, Part IV, . . . " International J. of Mass Spectrometry and Ion Processes, vol. 125, No. 2/3, pp. 171–185 (Jul. 13, 1993).

March, et al., "Kinetic Energy Effects in an Ion Ensemble . . . ", Organic Mass Spectrometry, vol. 28, pp. 499–509 (1993).

MASS SPECTOMETRY METHOD WITH APPLIED SIGNAL HAVING OFF-RESONANCE FREQUENCY

CROSS-REFERENCE TO RELATED APPLICATIONS

This is a continuation of application Ser. No. 08/083,972 filed on Jun. 28, 1993, abandoned which is a continuation-in-part of Ser. No. 08/034,170 filed on Mar. 18, 1993 (now abandoned), which is a continuation of Ser. No. 07/884,455 filed on May 14, 1992 (issued as U.S. Pat. No. 5,274,233), which is continuation of Ser. No. 07/662,191 filed Feb. 28, 1991 (now abandoned) for MASS SPECTROMETRY METHOD WITH APPLIED SIGNAL HAVING OFF-RESONANCE FREQUENCY. The text of the prior applications is incorporated herein by reference.

FIELD OF THE INVENTION

The invention relates to mass spectrometry methods in which ions are stably trapped in an ion trap and then selectively excited for detection. More particularly, the invention is a mass spectrometry method in which ions are stably trapped by a trapping field, a supplemental field having frequency nearly matching (but different from) a frequency component of the frequency spectrum of oscillation of a selected trapped ion is superimposed with the trapping field to form a combined field, and the combined field is changed to sequentially excite selected stably trapped ions.

BACKGROUND OF THE INVENTION

In a class of conventional mass spectrometry methods, a combined field (comprising trapping and supplemental field components of different spatial form) is established in an ion trap, and the combined field is changed to resonantly excite stably trapped ions for detection. For example, U.S. Pat. No. 3,065,640 (issued Nov. 27, 1962) describes a three-dimensional quadrupole ion trap with reference to FIG. 1 thereof. It teaches application of DC voltage 2 $V_{dc}$ and AC voltage 2 $V_{ac}$ across the trap's end electrode 13 and ring electrode 11 to establish a quadrupole trapping field in the trap, application of a supplemental voltage (having DC component $V_g$ and AC component 2 $V_\beta$) across the quadrupole trap's end electrodes 12 and 13 to establish a combined (trapping and supplemental) field in the trap, and changing the combined field by increasing one or both of simultaneously applied voltages $V_g$ and $V_{dc}$ to eject trapped ions from the trap through a hole 25 through end electrode 12 for detection at an external detector 26 (see col. 3, lines 13–18, and col. 9, lines 9–23, for example).

In a class of conventional mass spectrometry techniques known as "MS/MS" methods, ions (known as "parent ions") having mass-to-charge ratio (hereinafter denoted as "m/z") within a selected range are isolated in an ion trap. The stably trapped parent ions are then allowed or induced to dissociate (for example, by colliding with background gas molecules within the trap) to produce ions known as "daughter ions." The daughter ions are then ejected from the trap (typically by resonant ejection) and detected.

For example, U.S. Pat. No. 4,736,101, issued Apr. 5, 1988, discloses an MS/MS method in which ions (having m/z's within a predetermined range) are trapped within a three-dimensional quadrupole trapping field (established by applying a trapping voltage across the ring and end electrodes of a quadrupole ion trap). The trapping field is then scanned to eject unwanted parent ions (ions other than parent ions having a desired m/z) consecutively from the trap. The trapping field is then changed again to become capable of storing daughter ions of interest. The trapped parent ions are then induced to dissociate to produce daughter ions, and the daughter ions are ejected consecutively (sequentially by mass-to-charge ratio) from the trap for detection.

U.S. Pat. No. 4,736,101 teaches (at column 5, lines 16–42) establishment of a supplemental AC field (in addition to the trapping field) in the trap after the dissociation period, while the trapping voltage is scanned (or while the trapping voltage is held fixed and the frequency of the supplemental AC field is scanned). The frequency of the supplemental AC field matches one of the components of the frequency spectrum of trapped ion oscillation, so that the supplemental AC field resonantly ejects a sequence of stably trapped ions from the trap as the secular frequency of each trapped ion (in the changing combined field) comes to match the frequency of the supplemental AC field.

Similarly, U.S. Pat. No. 4,882,484 (issued Nov. 21, 1989) teaches resonant ejection of stably trapped ions from a three-dimensional quadrupole (or approximately quadrupole) trap by scanning a combined field (having RF trapping and supplemental AC field components) that has been established in an ion trap region, such as by scanning the supplemental field's frequency, or holding the supplemental field frequency fixed while scanning a parameter of the trapping field.

A disadvantage of conventional resonant excitation techniques (including resonant ejection methods) is that the changing parameters of the combined field must be carefully controlled during resonant excitation to avoid simultaneous ejection (loss of mass resolution) of different ion species and other undesirable interference effects. For example, consider a conventional resonant excitation method in which the frequency of the supplemental AC field component of the combined field is swept or scanned while other combined field parameters are held fixed. In this case, the peak-to-peak amplitude of the AC supplemental voltage signal which establishes the supplemental AC field component must be carefully controlled (it must be maintained at a particular amplitude, to allow ions of interest to establish a resonance condition), and the rate of change of the supplemental voltage signal's AC frequency must also be carefully controlled, to avoid unacceptable mass resolution decrease due to simultaneous ejection of different ion species.

*Quadrupole Mass Spectrometry and its Applications*, edited by P. H. Dawson, published by Elsevier, 1976, teaches at pp. 49–50 that if the frequency of the supplemental field applied during resonant excitation is close to, but different from the resonant frequency of a stably trapped ion, ions having different resonant frequency may be simultaneously excited for detection by the changing combined field. This is said to undesirably limit resolving power.

Another conventional technique for exciting stably trapped ions is known as "mass selective instability" excitation. Examples of this technique are described in above-referenced U.S. Pat. No. 4,882,484, and in European Patent Application Publication No. 350,159A (published Jan. 10, 1990).

In mass selective instability excitation, a trapping field (typically a quadrupole trapping field) is established in a trap region to stably trap ions, and one or more parameters of the trapping field are swept (or scanned) to cause trapped ions to become sequentially unstable. Each stably trapped ion is characterized by parameters which map to a location within a stability diagram determined by the trapping field. FIG. 2 is an example of a stability diagram for a quadrupole trapping field (FIG. 2 will be discussed in greater detail below). With reference to FIG. 2, ions having "a" and "q" parameters within the stability envelope (within the region bounded by the four curves labeled $\beta_r=0$, $\beta_z=1$, $\beta_r=1$, and $\beta_z=0$) can be stably trapped in the quadrupole trapping field (the parameters "e" and "m" in FIG. 2 denote charge and mass, respectively). In performing mass selective instability excitation, the changing trapping field causes ions to become unstable and ejects them by moving the "a" and/or "q" parameters of a sequence of stably trapped ions outside the stability diagram (from within the stability diagram).

In some conventional mass selective instability excitation methods, a supplemental field is established in the trap during sweeping or scanning of the trapping field (an AC oscillator is connected to one or both of the electrodes). For example, above-referenced European Patent Application 350,159A teaches (at column 3, line 58, through column 4, line 25) application of a supplemental AC voltage across the end electrodes of a quadrupole ion trap while sweeping or scanning parameters of a quadrupole trapping field in the trap. It also teaches that the quadrupole trapping field parameters can be fixed and the supplemental AC frequency swept or scanned to accomplish mass selective instability ejection. It also teaches that the quadrupole trapping field has an RF frequency component, the frequency of the supplemental AC voltage is preferably approximately equal to half the RF frequency (e.g., within plus or minus twenty percent of half the RF frequency), and the supplemental AC voltage has a frequency that matches the characteristic frequency of ion motion in the z (axial) direction.

In another conventional trapped ion excitation method, described in U.S. Pat. No. 4,749,860 (issued Jun. 7, 1988), a supplemental AC voltage is applied across end electrodes of a quadrupole ion trap while sweeping or scanning parameters of a quadrupole trapping field in the trap (for example, during period C in the scan diagram shown in FIG. 2 of U.S. Pat. No. 4,749,860). The frequency of the supplemental AC voltage is chosen to resonantly eject a sequence of stably trapped ions. At the same time, other trapped ions are said to become sequentially unstable in the presence of the changing combined field.

However, a disadvantage of mass selective instability excitation is that the dynamic range for the number of ions that can be stored and mass analyzed with sufficient mass resolution is very limited. Performance of the inventive method avoids this disadvantage by extending the dynamic range, and also avoids the above-described disadvantage of conventional resonant excitation methods.

In the context of quadrupole mass filter operation, rather than three-dimensional quadrupole trap operation, above-cited *Quadrupole Mass Spectrometry and its Applications* (1976), at pages 74–76, teaches superimposition of a sinusoidal supplemental field with the field establishing the quadrupole mass filter, with the frequency of the supplemental field differing by a small amount ($\Delta\omega$) from a secular frequency of a selected ion propagating through the filter. Application of such a supplemental field (which may be denoted as a "near resonance" or "off-resonance" supplemental field) is said to enable separation (filtering) of ions (by establishing a beat frequency condition) whose motion through the filter has such secular frequency from ions whose motion has slightly different secular frequency. However, this reference does not suggest that an "off-resonance" field should be applied as one component of a changing combined field (established in a three-dimensional ion trap) to sequentially excite selected trapped ions (by a mechanism other than resonant excitation or mass selective instability excitation). Also in the context of mass filter operation, rather than three-dimensional trap operation, U.S. Pat. No. 2,950,389, issued Aug. 23, 1960, teaches that application of a near resonance supplemental field enables separation (filtering) of ions whose motion through the filter has a first secular frequency from ions whose motion has slightly different secular frequency.

SUMMARY OF THE INVENTION

The invention is a mass spectrometry method including the steps of establishing a combined field (comprising a trapping field and a supplemental field), and changing at least one parameter of the combined field to excite ions trapped in the combined field sequentially (such as for detection). The supplemental field is a periodically varying field having an "off-resonance" frequency, in the sense that the supplemental field frequency nearly matches (but differs from) frequency of a frequency component of the frequency spectrum of oscillation of an ion stably trapped by the trapping field alone. The supplemental field is sometimes denoted herein as an "off-resonance" field.

Sequential ion excitation in accordance with the invention (sometimes denoted herein as "off-resonance" scanning or excitation) can rapidly eject a sequence of ions from a trap (or rapidly excite each ion in a sequence to a degree sufficient for a desired purpose such as detection) because the supplemental field will cause an increase in the trajectory of each ion in the sequence, due to the supplemental field having a sufficiently large peak-to-peak amplitude as to cause an increase in each ion mass trajectory to a desired magnitude within a desired short time period, without establishing a resonance condition, or before a resonance condition is established between the ion frequency of motion and the supplemental field frequency.

In one class of embodiments, trapped ions are sequentially excited by holding the off-resonance field fixed while changing at least one parameter of the trapping field component of the combined field. In other embodiments, trapped ions are sequentially excited by changing (such as sweeping or scanning) at least one parameter of the off-resonance field while holding the trapping field fixed.

In all embodiments, the peak-to-peak amplitude of the off-resonance field is kept sufficiently high to excite ions (via an off-resonance excitation mechanism) before they undergo resonant excitation. For example, if the off-resonance field frequency is swept, the peak-to-peak amplitude of the off-resonance field should be kept sufficiently high to eject each of a sequence of trapped ions from the combined field via off-resonance excitation, before the oscillatory motion of any ion in the sequence undergoes resonant excitation in the changing combined field.

In contrast, in conventional resonant excitation methods, the rate of change of a combined field is controlled, and a peak-to-peak amplitude of a (fixed or changing) supplemental field (whose frequency matches frequency of a trapped ion) is also controlled to keep it at a value that matches a frequency of motion of the ion of interest with the frequency of the applied supplemental AC field such that a resonance condition is established for excitation. If these parameters are not adequately controlled, simultaneous ejection of ions having different (but similar) m/z ratios (i.e., via resonant excitation of an ion having a first m/z ratio with simultaneous off-resonance excitation of a second ion having a second m/z ratio slightly different than the first m/z ratio) may occur. In a typical conventional resonant excitation the peak-to-peak amplitude of the supplemental field might be controlled to be less than one volt (to avoid interference effects such as that described above), whereas in a corresponding embodiment of the invention (one employing the same trapping field) the supplemental signal producing the off-resonance field could have peak-to-peak amplitude much greater than one volt (to enable mass analysis to be performed much more rapidly than in the conventional resonant excitation).

In preferred embodiments of the invention, the changing combined field sequentially ejects selected trapped ions from the combined field for detection (or purposes other than detection). In alternative embodiments, the invention sequentially excites trapped ions without ejecting them from the combined field.

In preferred embodiments, the combined field is established in a trap region surrounded by the ring electrode and two end electrodes of a three-dimensional quadrupole ion trap. In these embodiments, the combined field comprises a quadrupole trapping field produced by applying a fundamental voltage to one or more of the ring electrode and end electrodes, and a supplemental field produced by applying a supplemental AC voltage across the end electrodes. The amplitude of an RF (or DC) component of the fundamental voltage (or the frequency of the RF component) can be scanned or otherwise changed while the supplemental AC voltage is applied across the end electrodes, or the quadrupole trapping field can be held fixed while a parameter of the supplemental AC voltage is scanned or otherwise changed, to sequentially off-resonantly excite ions having a range of m/z ratios for detection (or for any of a variety of other purposes, including inducement of ion reaction or dissociation in the presence of a buffer gas).

DETAILED DESCRIPTION OF THE PREFERRED EMBODIMENTS

A class of preferred embodiments will be described with reference to the stability diagram shown in FIG. 2. In these embodiments, the trapping field (the trapping field component of the combined field) has a sinusoidal RF voltage component (of amplitude V and frequency Ω) and optionally a DC voltage component (of amplitude U), and is applied to the ring and end electrodes of a quadrupole ion trap of the type shown in FIG. 1.

Figure 2:
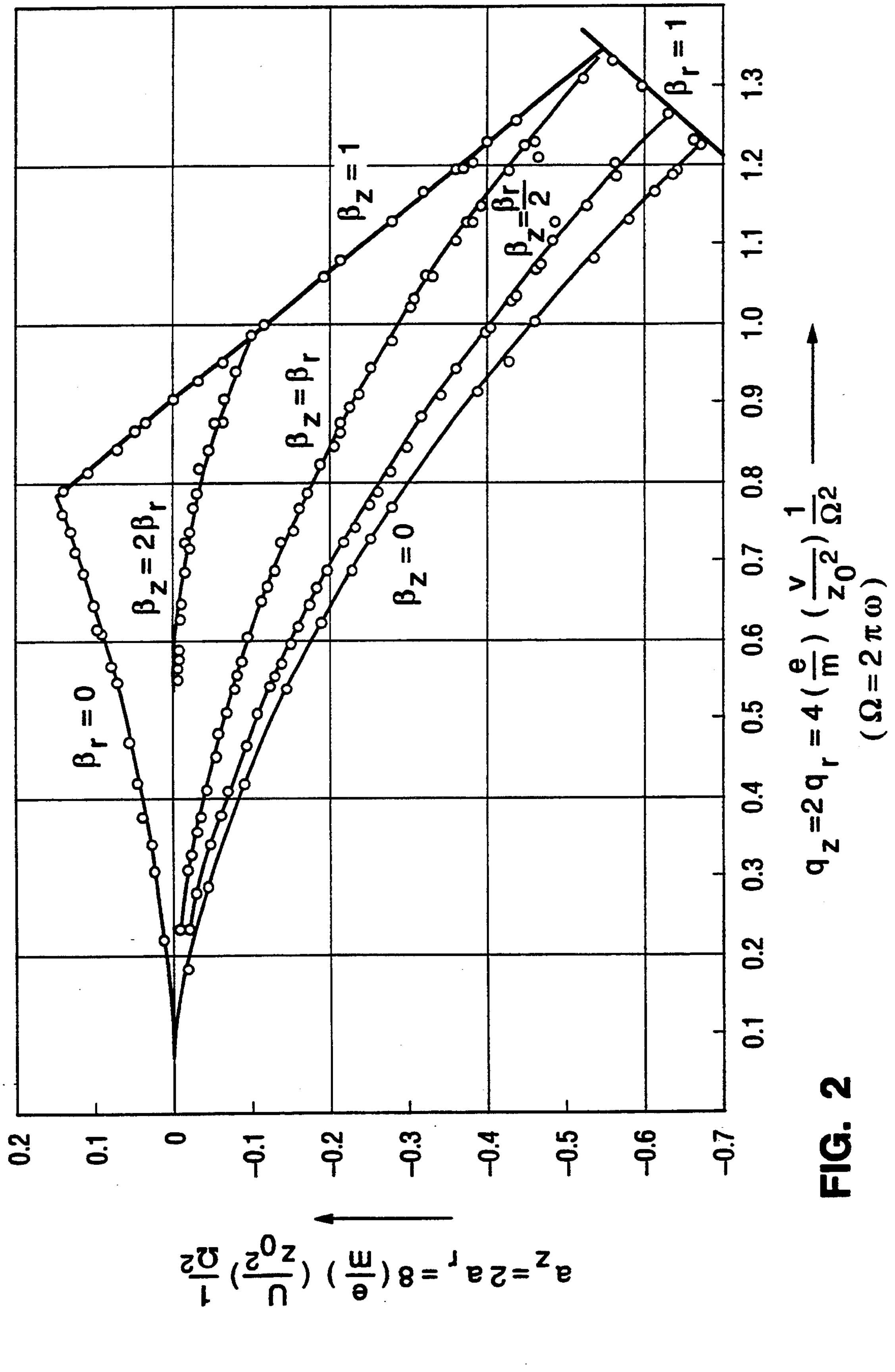
FIG. 2 is the stability diagram for a quadrupole trapping field which can be generated by the FIG. 1 apparatus.

For a quadrupole ion trap, solution of the well-known Mathieu equation specifies a stability diagram having the form shown in FIG. 2. With reference to FIG. 2, ions whose "a" and "q" parameters are within the stability envelope (within the region bounded by the four curves labeled $\beta_r=0$, $\beta_z=1$, $\beta_r=1$, and $\beta_z==0$) can be stably trapped in the quadrupole trapping field (the parameters "e" and "m" in FIG. 2 denote charge and mass, respectively). Ions whose radial motion is characterized by parameter $\beta_r$ within the range $0<\beta_r<1$, and whose axial motion is characterized by parameter $\beta_z$ within the range $0<\beta_z<1$, will be stably trapped.

Figure 1:
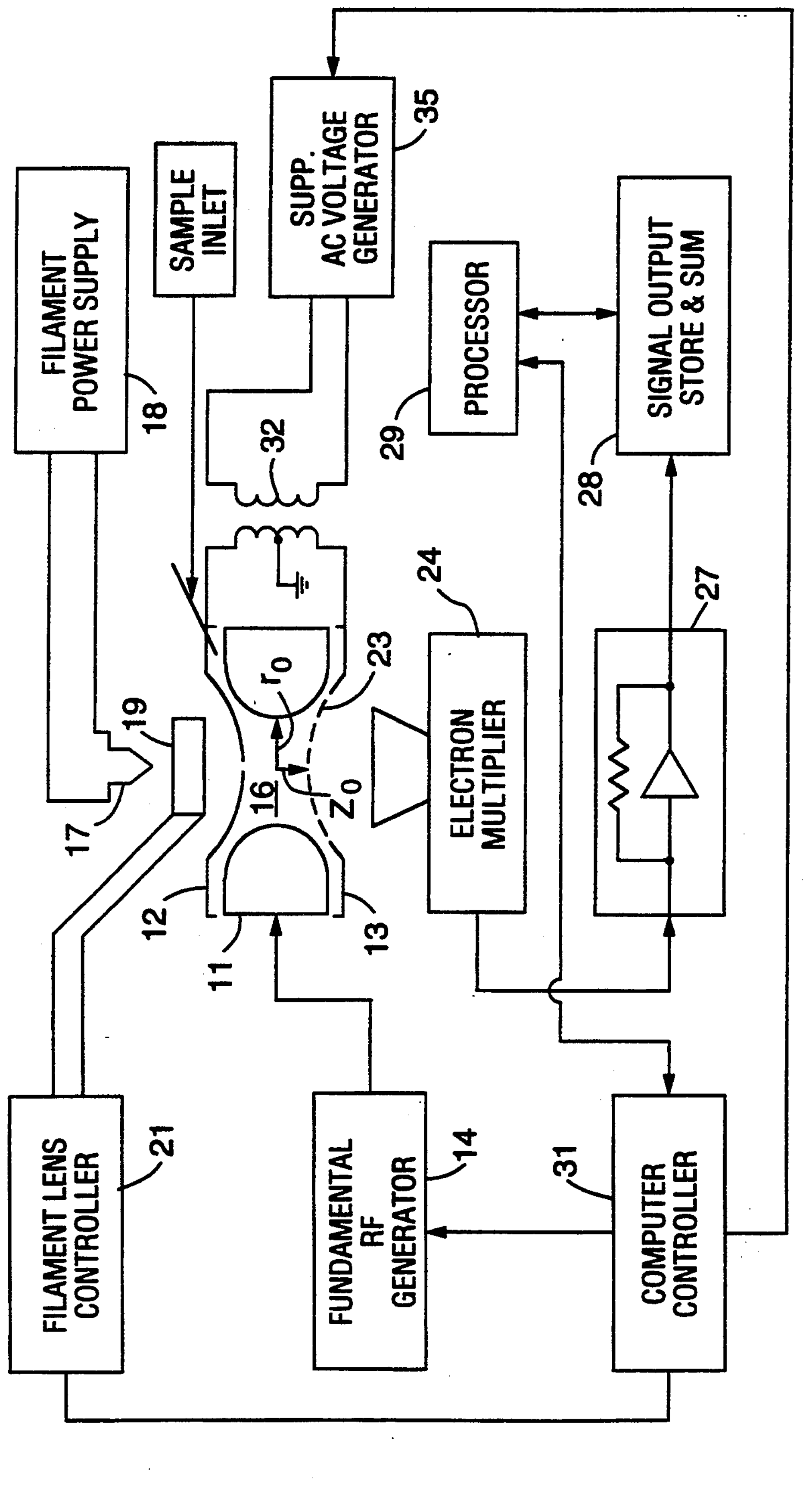
FIG. 1 is a simplified schematic diagram of an apparatus useful for implementing a class of preferred embodiments of the invention.

The quadrupole ion trap apparatus shown in FIG. 1 is useful for implementing a class of preferred embodiments of the invention. The FIG. 1 apparatus includes ring electrode 11 and end electrodes 12 and 13. A three-dimensional quadrupole trapping field is established in region 16 enclosed by electrodes 11–13, when fundamental voltage generator 14 is switched on (in response to a control signal from control circuit 31) to apply a fundamental voltage between electrode 11 and electrodes 12 and 13. The fundamental voltage comprises a sinusoidal voltage having amplitude V and frequency ω and optionally also a DC component of amplitude U. ω is typically within the radio frequency (RF) range.

Ion storage region 16 has radius $r_o$ and vertical dimension $z_o$. Electrodes 11, 12, and 13 are common mode grounded through coupling transformer 32.

Supplemental AC voltage generator 35 can be switched on (in response to a control signal from control circuit 31) to apply a desired supplemental AC voltage across end electrodes 12 and 13 as shown (or alternatively, between electrode 11 and one or both of electrodes 12 and 13). In preferred embodiments, the supplemental AC voltage signal produced by generator 35 is selected to have a peak-to-peak amplitude $V_{supp}$, and an "off-resonance" frequency $\omega_{supp}$ (to be described below). The combined field comprising the quadrupole trapping field and the supplemental ("off-resonance") field established by the supplemental AC voltage can be changed to sequentially excite desired trapped ions in accordance with the invention, for detection (or other purposes). In some embodiments, the combined field is changed by scanning or sweeping (hereinafter denoted as "scanning") one or more parameters (V, ω, U, $V_{supp}$, and $\omega_{supp}$) of the combined field resulting from the voltage signals output from both elements 14 and 35 to sequentially excite desired trapped ions.

Filament 17, when powered by filament power supply 18, directs an ionizing electron beam into region 16 through an aperture in end electrode 12. The electron beam ionizes sample molecules within region 16, so that the resulting ions can be trapped within region 16 by the quadrupole trapping field. Cylindrical gate electrode and lens 19 is controlled by filament lens control circuit 21 to gate the electron beam off and on as desired.

In one embodiment, end electrode 13 has perforations 23 through which ions can be ejected from region 16 for detection by an externally positioned electron multiplier detector 24. Electrometer 27 receives the current signal asserted at the output of detector 24, and converts it to a voltage signal, which is summed and stored within circuit 28, for processing within processor 29.

In a variation on the FIG. 1 apparatus, perforations 23 are omitted, and an in-trap detector is substituted.

Such an in-trap detector can comprise the trap's end electrodes themselves. For example, one or both of the end electrodes could be composed of (or partially composed of) phosphorescent material (which emits photons in response to incidence of ions at one of its surfaces). In another class of embodiments, the in-trap ion detector is distinct from the end electrodes, but is mounted integrally with one or both of them (so as to detect ions that strike the end electrodes without introducing significant distortions in the shape of the end electrode surfaces which face region 16). One example of this type of in-trap ion detector is a Faraday effect detector in which an electrically isolated conductive pin is mounted with its tip flush with an end electrode surface (preferably at a location along the z-axis in the center of end electrode 13). Alternatively, other kinds of in-trap ion detectors can be employed, such as ion detectors which do not require that ions directly strike them to be detected (examples of this latter type of detector, which shall be denoted herein as an "in-situ detector," include resonant power absorption detection means, and image current detection means).

The output of each in-trap detector is supplied through appropriate detector electronics to processor 29.

In some embodiments, generator 35 is replaced by a generator for applying a supplemental AC signal of sufficient power to the-ring electrode (rather than to the end electrodes) to induce ions to leave the trap in radial directions (i.e., radially toward ring electrode 11) rather than in the z-direction. Application of a high power supplemental signal to the trap in this manner to eject unwanted ions out of the trap in radial directions before detecting other ions using a detector mounted along the z-axis can significantly increase the operating lifetime of the ion detector, by avoiding saturation of the detector during application of the supplemental signal.

If the quadrupole trapping field has a DC component, it can have both a high frequency and low frequency cutoff, and will be incapable of trapping ions with frequencies of oscillation below the low frequency cutoff or above the high frequency cutoff.

Control circuit 31 generates control signals for controlling fundamental voltage generator 14, filament control circuit 21, and supplemental AC voltage generator 35. Circuit 31 sends control signals to circuits 14, 21, and 35 in response to commands it receives from processor 29, and sends data to processor 29 in response to requests from processor 29.

Control circuit 31 preferably includes a digital processor or analog circuit, of the type which can rapidly create and control the frequency-amplitude spectrum of each supplemental voltage signal asserted by supplemental AC voltage generator 35 (or a suitable digital signal processor or analog circuit can be implemented within generator 35). A digital processor suitable for this purpose can be selected from commercially available models. Use of a digital signal processor permits rapid generation of a sequence of supplemental voltage signals having different frequency-amplitude spectra (such as application of a notch-filtered broadband signal during ion storage).

In accordance with the invention, a trapping field is established in a trap region (e.g., region 16 of FIG. 1), and ions are formed or introduced in the trapping field and are stably trapped therein. The trapping field is capable of storing ions having m/z ratio within a selected range, corresponding to a trapping range of ion frequencies. A combined field (comprising the trapping field and a supplemental field) is established in the trap region, and at least one parameter of the combined field is changed to excite selected ones of the trapped ions sequentially (such as for detection). The supplemental field is periodically varying, with its frequency being an "off-resonance" frequency which nearly matches (but differs from) a frequency of motion of an ion stably trapped by the trapping field alone. The supplemental field is sometimes denoted herein as an "off-resonance" field.

Sequential ion excitation in accordance with the invention ("off-resonance" scanning or excitation) can rapidly eject a sequence of the trapped ions from the trap region (or rapidly excite each ion in such sequence to a degree sufficient for a desired purpose) because the off-resonance field will cause an increase in the trajectory of each ion in the sequence, and because the off-resonance field can have a sufficiently large peak-to-peak amplitude to increase each ion trajectory to a desired magnitude within a desired short time period.

In one class of embodiments, trapped ions are sequentially excited by holding the off-resonance field fixed while changing at least one parameter of the trapping field component of the combined field. In other embodiments, trapped ions are sequentially excited by changing (such as scanning) at least one parameter of the off-resonance field while holding the trapping field fixed.

In all embodiments, the peak-to-peak amplitude of the off-resonance field is kept sufficiently high to excite ions (via an off-resonance excitation mechanism) before they undergo resonant excitation. For example, if the off-resonance field frequency is swept, the peak-to-peak amplitude of the off-resonance field is kept sufficiently high to eject each of a sequence of trapped ions from the combined field via off-resonance excitation, before the secular motion of any ion in the sequence undergoes resonant excitation in the changing combined field.

In contrast, in conventional resonant excitation methods, the rate of change of combined field parameters and the peak-to-peak amplitude of the (fixed or changing) supplemental field (whose frequency matches the secular frequency of a trapped ion) is controlled to keep it below a value which would cause simultaneous ejection of ions having different (but similar) m/z ratios (i.e., via resonant excitation of an ion having a first m/z ratio with simultaneous off-resonance excitation of a second ion having a second m/z ratio slightly different than the first m/z ratio). In a typical conventional resonant excitation the peak-to-peak amplitude of the supplemental field might be controlled to be less than one volt (to avoid interference effects such as that described above), whereas in a corresponding embodiment of the invention (one employing the same trapping field) the supplemental signal producing the off-resonance field could have peak-to-peak amplitude much greater than one volt (to enable mass analysis to be performed much more rapidly than in the conventional resonant excitation).

With reference to FIG. 2, the off-resonance field component of the inventive changing combined field excites a sequence of trapped ions in the following manner. The frequencies of motion of each trapped ion are defined by parameters that map to a point within the stability envelope (in embodiments in which the trapping field is not a quadrupole trapping field, the shape of the stability envelope can differ from that shown in FIG. 2). The off-resonance field component of the changing combined field excites each ion in the sequence (via off-resonance excitation) to increase the ion's trajectory without causing the ion to become unstable. In other words, during off-resonance excitation, the parameters of the ions's motion continue to map to a point within the stability envelope. Each ion is excited to a desired degree within a desired time (via off-resonance excitation) before the point to which the ion maps in the stability envelope matches a resonance point (i.e., before the frequency of ion motion matches the frequency of the applied supplemental AC signal, and thus, before the ion undergoes resonant excitation in the changing combined field).

In preferred embodiments, the changing combined field sequentially ejects selected trapped ions from the combined field for detection (or purposes other than detection). In alternative embodiments, the invention sequentially excites trapped ions without ejecting them from the combined field.

In preferred embodiments, the combined field is established in the trap region (e.g. region 16 shown in FIG. 1) of a three-dimensional quadrupole ion trap (such as that shown in FIG. 1). In these embodiments, the combined field comprises a quadrupole trapping field produced by applying the above-described fundamental voltage to one or more of the ring electrode and end electrodes of the trap, and an off-resonance supplemental field produced by applying a supplemental AC voltage across the end electrodes. The amplitude of an RF (or DC) component of the fundamental voltage (or the frequency of the RF component) can be scanned or otherwise changed while the supplemental AC voltage is applied across the end electrodes, or the quadrupole trapping field can be held fixed while a parameter of the supplemental AC voltage is scanned or otherwise changed, to sequentially excite ions having a range of m/z ratios for detection (or for any of a variety of other purposes, including inducement of ion reaction or dissociation in the presence of a buffer gas).

A second supplemental field can be superimposed with the trapping field (before or during superimposition of the off-resonance field with the trapping field) to eject unwanted ions having m/z ratio within a second selected range from the combined field, wherein the second supplemental field has frequency components within a lower frequency range from a first frequency up to a notch frequency band, and within a higher frequency range from the notch frequency band up to second frequency, and wherein the frequency range spanned by the first frequency and the second frequency includes the trapping range. Such second supplemental field can eject ions from the trap region (other than selected ions), thereby preventing storage of undesired ions which might otherwise interfere with subsequent mass spectrometry operations.

In variations on the above-described embodiments, the second supplemental field has two or more notch frequency bands (i.e., absences of frequency components). For example, the second supplemental field can have frequency components within a low frequency range from a first frequency up to a first notch frequency band, within a middle frequency range from the first notch frequency band to a second notch frequency band, and within a high frequency range from the second notch frequency band up to a second frequency. For many mass analysis applications, each of the second supplemental field's frequency components preferably has an amplitude in the range from 10 mV to 10 volts.

In some embodiments, one or more parameters of the combined field are changed to sequentially excite trapped ions in a manner for implementing an $(MS)^n$ mass analysis operation, where n=2, 3, 4, or more. In such an $(MS)^n$ operation, the combined field can be changed (for example, by changing the frequency of, and switching on the off-resonance field component of the combined field) to induce dissociation of parent or daughter ions, and then changed in a different manner (e.g., by being swept or scanned) to perform mass analysis of daughter ions.

In any of the above-described embodiments, the trapping field and off-resonance field can be established by applying voltage signals to ion trap apparatus electrodes which surround the trap region. In preferred embodiments, the trapping field is a quadrupole field determined by a sinusoidal fundamental voltage signal having a DC voltage component (of amplitude U) and an RF voltage component (of amplitude V and frequency ω) applied to one or more of the ring electrode and end electrodes of a quadrupole ion trap.

In preferred embodiments, a buffer or collision gas (such as, but not limited to, Helium, Hydrogen, Argon, or Nitrogen) is introduced into or removed from the trap region during any portion of the experiment and/or the mass analysis step (i.e., during the step of changing the combined field) to improve mass resolution and/or sensitivity.

In alternative embodiments of the invention, the trapping field component of the combined field is a hexapole (or octopole or higher order multipole) trapping field, which is established by applying a sinusoidal (or other periodic) fundamental voltage to the electrodes of a hexapole (or octopole or higher order multipole) ion trap.

In any of the embodiments of the invention:

while changing the combined field, the rate of change of one or more parameters of the combined field can be controlled to achieve a desired mass resolution;

an automatic sensitivity control method can be employed while changing the combined field;

non-consecutive mass analysis can be performed while changing the combined field (e.g., the combined field can be changed by superimposing a sequence of off-resonance fields thereon, with each off-resonance field having a frequency selected to excite ions of an arbitrarily selected m/z ratio);

the combined field can include a second supplemental field having a frequency spectrum including one or more notches (i.e., absences of frequencies) at frequency bands selected to eliminate interferences, for example due to leakage of permeable gases into a sealed ion trap (such as one sealed by O-rings) or any other unwanted m/z's, with a mass analysis operation;

the combined field can include one or more "pump" fields (each of substantially identical spatial form as the trapping field). These fields can, for example, be selected so that the combined trapping and pump fields define a frequency spectrum including one or more notches at frequency bands appropriately selected to perform a desired mass spectrometry operation, such as a chemical ionization (CI) operation or a selected reagent ion CI operation, while protecting the ion detector from damage due to the presence of unwanted ions;

in the presence of the combined field, the energy of electrons introduced into an ion trap can be controlled so that the electrons do not create unwanted ions (such as by ionizing collision, CI, and/or solvent gas in the trap and/or an associated vacuum chamber);

the combined field can be established in an ion cyclotron resonance (ICR) trap, and the combined field can be changed to excite ions in the ICR trap for detection;

different gas pressure can be maintained in an ion injection transport system, the ion trap, and/or the ion detector, to optimize the performance of the overall analysis;

an ion trap or vacuum system can be used which has O-rings or permeable membranes designed for supplying atmospheric gasses into the region of the combined field, and one or more of the gasses can be ionized and selectively stored for use in performing CI or charge exchange reactions, or the unionized gasses can enable collisional dissociation or cooling of trapped ions; and in an ion trap mass spectrometer which has an electrode structure which can store and/or mass analyze ions, and functions as the vacuum chamber of the mass spectrometer, the combined field can be designed to have a frequency-amplitude spectrum for removing unwanted ions from within the electrode structure.

Various other modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) changing the combined field to excite selected trapped ions in the trap region, wherein the trapping field is a quadrupole trapping field resulting from application of a voltage to at least one electrode of a quadrupole ion trap apparatus, wherein the supplemental field results from application of a second voltage to at least one electrode of the quadrupole ion trap apparatus, and wherein step (c) includes the step of:

changing a parameter of at least one of the voltage and the second voltage.

2. The method of claim 1, wherein said parameter is an amplitude of at least one of the voltage and the second voltage.

3. The method of claim 1, wherein said parameter is a frequency of at least one of the voltage and the second voltage.

4. The method of claim 1, wherein the voltage is a sinusoidal fundamental voltage signal having an RF voltage component of amplitude V and frequency $\omega$, and wherein the second voltage is a sinusoidal supplemental voltage signal of amplitude $V_{supp}$ and frequency $\omega_{supp}$.

5. The method of claim 4, wherein the sinusoidal fundamental voltage signal also has a DC voltage component.

6. The method of claim 1, wherein step (c) includes the step of controlling a rate of change of at least one parameter of the combined field to achieve a desired mass resolution.

7. The method of claim 1, wherein step (c) includes the step of changing the combined field to sequentially excite the selected trapped ions for detection.

8. The method of claim 1, wherein step (c) includes the step of changing the combined field to sequentially excite the selected trapped ions for ejection from the trap region.

9. The method of claim 1, wherein step (c) includes the step of changing the combined field to sequentially excite the selected trapped ions for ejection from the trap region followed by detection by a detector located outside said trap region.

10. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) changing the combined field to excite selected trapped ions in the trap region, wherein step (c) includes the step of performing non-consecutive mass analysis.

11. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency;

(c) changing the combined field to excite selected trapped ions in the trap region; and (d) superimposing a second supplemental field with at least one of the trapping field and the combined field, said second supplemental field having a frequency spectrum which includes at least one notch at a selected frequency band.

12. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) changing the combined field to excite selected trapped ions in the trap region, wherein during step (c), the supplemental field of the combined field has a sufficiently large peak-topeak amplitude so that the combined field increases a trajectory of each of the selected trapped ions to a desired magnitude within a desired time period.

13. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency;

(c) changing the combined field to excite selected trapped ions in the trap region; and (d) introducing at least one of a collision gas and a buffer gas to the trap region to improve at least one of mass resolution and sensitivity.

14. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) scanning at least one parameter of the combined field to sequentially excite selected trapped ions in the trap region, wherein the supplemental field has a peak-to-peak amplitude, and wherein step (c) includes the step of:

holding the supplemental field substantially fixed, while scanning at least one parameter of the trapping field and keeping the peak-to-peak amplitude of the supplemental field sufficiently high so that the combined field sequentially excites the selected trapped ions by an off-resonance excitation mechanism before said selected trapped ions undergo resonant excitation.

15. The method of claim 14, wherein the trapping field is a quadrupole trapping field produced by applying a fundamental voltage to at least one electrode of a quadrupole ion trap apparatus, and wherein step (c) includes the step of:

scanning an amplitude of a component of the fundamental voltage.

16. The method of claim 14, wherein the trapping field is a quadrupole trapping field produced by applying a fundamental voltage to at least one electrode of a quadrupole ion trap apparatus, and wherein step (c) includes the step of:

scanning a frequency of the fundamental voltage.

17. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) scanning at least one parameter of the combined field to sequentially excite selected trapped ions in the trap region, wherein the supplemental field has a peak-to-peak amplitude, and wherein step (c) includes the step of:

scanning at least one parameter of the supplemental field, while holding the trapping field substantially fixed and keeping the peak-to-peak amplitude of the supplemental field sufficiently high so that the combined field sequentially excites the selected trapped ions by an off-resonance excitation mechanism before said selected trapped ions undergo resonant excitation.

18. The method of claim 17, wherein the supplemental field is produced by applying a supplemental AC voltage to at least one electrode of a quadrupole ion trap apparatus, and wherein step (c) includes the step of:

scanning an amplitude of a component of the supplemental AC voltage.

19. The method of claim 17, wherein the supplemental field is produced by applying a supplemental AC voltage to at least one electrode of a quadrupole ion trap apparatus, and wherein step (c) includes the step of:

scanning a frequency of the supplemental AC voltage.

20. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency;

(c) scanning at least one parameter of the combined field to sequentially excite selected trapped ions in the trap region; and (d) superimposing a second supplemental field with at least one of the trapping field and the combined field, said second supplemental field having a frequency spectrum which includes at least one notch at a selected frequency band.

21. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency; and (c) scanning at least one parameter of the combined field to sequentially excite selected trapped ions in the trap region, wherein during step (c), the supplemental field of the combined field has a sufficiently large peak-to-peak amplitude so that the combined field increases a trajectory of each of the selected trapped ions to a desired magnitude within a desired time period.

22. A mass spectrometry method, including the steps of:

(a) establishing a trapping field capable of stably trapping ions having mass to charge ratio within a selected range in a trap region;

(b) superimposing a supplemental field with the trapping field to form a combined field in the trap region, said supplemental field having an off-resonance frequency;

(c) scanning at least one parameter of the combined field to sequentially excite selected trapped ions in the trap region; and (d) introducing at least one of a collision gas and a buffer gas to the trap region to improve at least one of mass resolution and sensitivity.

* * * * *